(12) United States Patent
Post (10) Patent No.: US 8,823,233 B2
(45) Date of Patent: Sep. 2, 2014

(54) PASSIVE MAGNETIC BEARING SYSTEM (75) Inventor: Richard F. Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 770 days.

(21) Appl. No.: 12/985,980

(22) Filed: Jan. 6, 2011

(65) Prior Publication Data
US 2012/0175985 A1 Jul. 12, 2012

(51) Int. Cl.
*H02K 7/09* (2006.01)
*F16C 32/04* (2006.01)

(52) U.S. Cl.
CPC ......... *F16C 32/0436* (2013.01); *F16C 32/0448* (2013.01); *F16C 2361/55* (2013.01)
USPC ........................................ 310/90.5

(58) Field of Classification Search
CPC ....... H02K 7/09; F16C 32/04; F16C 32/0408; F16C 32/0417; F16C 32/0419
USPC ........................................ 310/90.5
See application file for complete search history.

(56) References Cited

U.S. PATENT DOCUMENTS

| 2,305,416 | A | * | 12/1942 | Hansen, Jr. | 310/90.5 |
| 5,495,223 | A | | 2/1996 | Honda et al. | |
| 5,847,480 | A | | 12/1998 | Post | |
| 6,111,332 | A | * | 8/2000 | Post | 310/90.5 |
| 6,657,344 | B2 | | 12/2003 | Post | |
| 7,078,838 | B2 | | 7/2006 | Post | |

* cited by examiner

*Primary Examiner* — John K Kim
*Assistant Examiner* — David Scheuermann
(74) *Attorney, Agent, or Firm* — John P. Wooldridge (57) ABSTRACT

An axial stabilizer for the rotor of a magnetic bearing provides external control of stiffness through switching in external inductances. External control also allows the stabilizer to become a part of a passive/active magnetic bearing system that requires no external source of power and no position sensor. Stabilizers for displacements transverse to the axis of rotation are provided that require only a single cylindrical Halbach array in its operation, and thus are especially suited for use in high rotation speed applications, such as flywheel energy storage systems. The elimination of the need of an inner cylindrical array solves the difficult mechanical problem of supplying support against centrifugal forces for the magnets of that array. Compensation is provided for the temperature variation of the strength of the magnetic fields of the permanent magnets in the levitating magnet arrays.

31 Claims, 7 Drawing Sheets

PASSIVE MAGNETIC BEARING SYSTEM

STATEMENT REGARDING FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to magnetic bearing systems, and more specifically, it relates to axial and transverse stabilizers for such systems.

2. Description of Related Art

Passive magnetic bearing systems developed at Lawrence Livermore National Laboratory (LLNL) have been described in several U.S. patents, e.g., U.S. Pat. No. 5,495,223 "Dynamically Stable Magnetic Suspension System," and U.S. Pat. No. 5,847,480, "Passive Magnetic Bearing Element with Minimal Power Losses." Studies now underway at the LLNL address two special applications of flywheel energy storage in modular electromechanical batteries (EMBs). The first of these is the bulk storage of electrical energy for a variety of applications, including energy generated by solar and wind power systems. The second application is energy storage for vehicular uses. These two applications share the requirement that they should have minimal parasitic losses, that is, they must be capable of holding their charge for a period of days (for bulk storage systems) to weeks (for vehicular storage systems when the vehicle is not in use). In addition, the passive bearings of a vehicular system, when the vehicle is in use, must be stiff enough to be able to withstand substantial accelerations. The new concepts address both of these issues.

As is well known, any successful magnetic bearing system must be able to deal with the consequences of Earnshaw's Theorem. In essence this theorem asserts the impossibility of achieving the stable levitation of an object employing only the static attracting or repelling forces of permanent magnet elements. No matter how one arranges such magnets Earnshaw's Theorem guarantees that the will be some perturbation, involving either axial, radial, or tilting displacements, that will grow unstably. So-called "active" magnetic bearings overcome Earnshaw's Theorem by introducing sensors, feedback amplifiers, and control magnets that together act to suppress the instability.

The LLNL passive magnetic hearing systems employ dynamic effects to overcome Earnshaw's Theorem. That is, they typically consist of an array of permanent magnets to provide levitation and/or centering forces, backed up by "stabilizers" that employ repelling forces associated with currents induced in stationary windings by the time-varying magnetic fields from magnet arrays (typically Halbach arrays) that are attached to the rotating system. Since such a system is unstable when at rest, means are provided for mechanical support that then disengages when the system is rotating.

The general prescription for achieving stable levitation in such a passive bearing system is that the levitating magnet system is designed so that it is intrinsically stable (i.e., possesses positive stiffness) for two of the three perturbations: axial, radial, or tilt. The remaining unstable perturbation is then rendered stable by using a stabilizer whose positive stiffness against that perturbation is greater than the negative stiffness of the levitating magnets against that same perturbation.

It is desirable that additional constraints on the bearing system be addressed in particular applications. Examples of such constraints are applications where the positive stiffness requirements may vary during operation of the system. An example would be a flywheel system for use in a vehicle. When the vehicle is at rest, the net positive stiffness need only be sufficient to insure stability of the EMB rotor in the absence of accelerations. It is desirable to provide a stabilizer that minimizes the resistive losses in the windings when in the standby mode, thus allowing long self-discharge times. When the vehicle is in motion, however, it is desirable that the stabilizer stiffness be increased to maintain centering under the accelerations that are encountered.

SUMMARY OF THE INVENTION

The invention pertains to improved versions of passive magnetic bearings of the types described in previous Lawrence Livermore National Laboratory (LLNL) patents such as U.S. Pat. No. 5,847,480, incorporated herein by reference and U.S. Pat. No. 5,495,223, incorporated herein by reference. The improvements include embodiments of a redesigned axial stabilizer; one with provision for external control of its stiffness through switching in external inductances, for example. External control also allows the stabilizer to become a part of a passive/active magnetic bearing system; one that requires no external source of power and no position sensor, since it operates by sensing the voltage generated in its stabilizer windings and responds by using electronic switches to control the current that flows in the windings. The invention also provides embodiments of an improved stabilizer for displacements transverse to the axis of rotation; one that requires only a single cylindrical Halbach array in its operation, and thus is especially suited for use in high rotation speed applications, such as flywheel energy storage systems. The elimination of the need of an inner cylindrical array solves the difficult mechanical problem of supplying support against centrifugal forces for the magnets of that array. Embodiments of the invention include a method and apparatus for compensation for the temperature variation of the strength of the magnetic fields of the permanent magnets in the levitating magnet arrays. This temperature compensation assures that once the bearing system elements are aligned so as to minimize the currents and consequent power losses in the axial stabilizer, this alignment will be preserved under changes in the ambient temperature of the system.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention is concerned with satisfying constraints on passive magnetic bearing systems that may be associated with a particular application. Examples of such constraints are applications where the positive stiffness requirements may vary during operation of the system. An example would be a flywheel system to be used in a vehicle. When the vehicle is at rest the net positive stiffness need only be sufficient to insure stability of the EMB rotor in the absence of accelerations. The stabilizer can thus be designed to minimize the resistive losses in the windings when in the standby mode, thus allowing long self-discharge times. When the vehicle is in motion, however, the stabilizer stiffness must be increased to maintain centering under the accelerations that are encountered. In stationary applications, it may be desirable to find a simple means to "tune" the levitation magnet/stabilizer system to minimize its power losses.

Some embodiments of the new invention include a means for introducing continuous active control of the stabilizer. This means requires no external source of electrical power to control the stabilizing forces, but only that electrical power associated with simple electronic switching circuits. For example, this kind of active control of the stiffness of the stabilizer would provide a means for making the bearing system in a vehicular EMB responsive to the effects of accelerations encountered when the vehicle is in motion.

Figure 1:
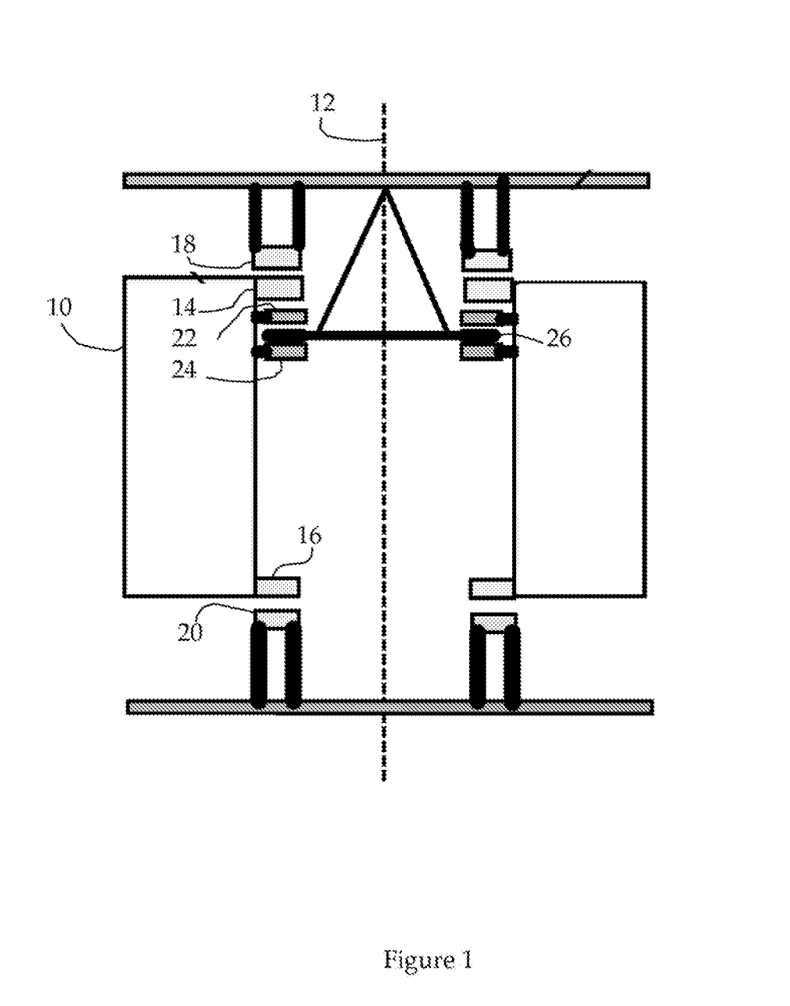
FIG. 1 shows a schematic drawing that illustrates one of the passive hearing systems.

An exemplary embodiment of a passive bearing system according to the present invention is shown in FIG. 1. In this vertical-axis system, the levitation is accomplished by a combination of a lower repelling magnet assembly plus an upper attracting magnet assembly. The positive stiffness for radial displacements of the upper (attracting) magnet assembly is by design made to be greater than the negative stiffness of the lower (repelling) magnet assembly so that the coupled assembly is stable against transverse displacements and tilt displacements from equilibrium, but unstable against vertical displacements. To render the system also stable against vertical displacements an improved Halbach-array stabilizer (described below) is employed, the outline of which is shown schematically in FIG. 1. Alternately, if the lower magnet assembly has a greater negative (repelling) stiffness than the radial stiffness of the upper (attracting) magnet assembly, the bearing system will be stable against vertical displacements and tilt displacements, but will be unstable against transverse displacements. As discussed infra, the present invention describes a means for stabilizing the system against transverse displacement. More specifically, this FIG. 1 shows the exemplary embodiment in cross-section, and includes a rotor 10 having an axis of rotation 12 and including a first magnet 14 at a first end of the rotor and a second magnet 16 at the other end of the rotor. A first bearing magnet 18 is positioned to attract the first magnet and is fixedly mounted external to the rotor. A second bearing magnet 20 is positioned to repel the second magnet and is fixedly mounted external to the rotor. In some embodiments, second bearing magnet 20 is configured to attract the second magnet. A first Halbach array 22 and a second Halbach array 24 are attached to the inner wall of the rotor. A conductor array 26 comprising windings is located between the first Halbach array and the second Halbach array. The conductor array is fixedly mounted external to the rotor.

Figure 2:
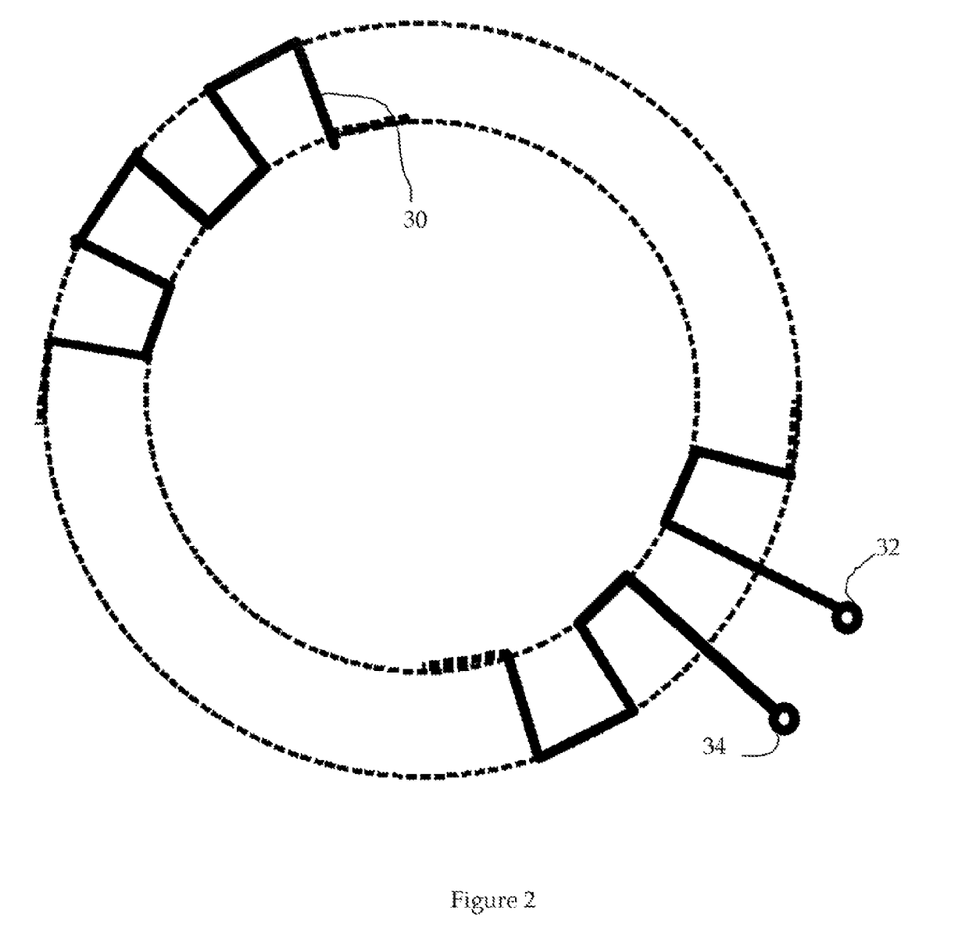
FIG. 2 shows the special conductor arrays consisting of windings having a periodicity of one-half of the azimuthal wavelength of the Halbach arrays.

The geometry and general specifications of a planar Halbach-array stabilizer, i.e., one designed to provide positive stiffness for axially directed displacements, are described in U.S. Pat. No. 5,847,480, "Passive Magnetic Bearing Element with Minimal Power Losses," incorporated herein by reference. Embodiments of the improved stabilizer of the present invention employ one or more special conductor arrays externally connected to other elements that together with the windings provide new modes of operation. Two segments of the conductor array 26 of FIG. 1 are shown in FIG. 2 to consist of windings 30 having a periodicity of one-half of the azimuthal wavelength of the Halbach arrays. Although only two segments of the windings are shown, they extend in electrical continuity from a first end or lead 32 to a second end or lead 34. When more than one such winding is employed the windings would be typically oriented with equal gaps between all of the radially directed conductors, i.e., if two such windings are employed the conductors of alternate windings would be spaced one-quarter wavelength apart.

Preferably the windings would be fabricated of litz wire (conductor cables made of specially transposed bundles of insulated fine wires). The use of litz wire, common in radio-frequency apparatus, has the important property of reducing parasitic eddy-current losses to a minimum, and also of spatially averaging the magnetic fields to which it is exposed. Since eddy current losses vary as the fourth power of the size of the conductor, by choosing Litz wire composed of many strands of very fine wire, one can reduce parasitic eddy current losses to a small value in most situations of practical interest.

As noted, each winding terminates in two leads to outside terminals. To these terminals there will be attached various elements, depending on the function to be performed. A virtue of using the type of winding just described is that its design insures that a plane will exist between the two Halbach arrays where a true null in the voltage generated will exist, even in the presence of minor field and geometry errors. This important property arises from the fact that the winding, in effect, takes an average value of the rotating field to which it is exposed. Displacements in one direction will result in a particular first phase of output from the winding, while displacements in the opposite direction will result in a phase that is 180 degrees out of phase with respect to the first phase, thus there will always exist a "null plane" where the generated voltage (and current) in the winding sums to zero. A displacement will produce a voltage in the windings that are nearest to the array, and this voltage will drive the windings, and hence the vertical placement of the rotor, back toward the null position.

The above fact defines one aspect of the new invention, as follows. A configuration of a passive bearing system so that it will function with minimal losses, a measurement of the voltage appearing across these terminals can be used to determine the proper axial positions of all the bearing elements, i.e., the upper and lower levitation magnet arrays and the stabilizer. When the system is rotating and when all of the passive bearing elements are oriented correctly with respect to each other, the voltage across these terminals will approach zero. At this point the levitation magnets will be taking the entire load and the resistive power losses in the stabilizer will also be zero (apart from residual eddy current losses in the litz wire conductors).

As mentioned above, the new bearing system has the potential to operate in a "dual-mode" regime as may be required. This kind of operation is made possible by the attachment of mechanical or electronic switches to the terminals of the stabilizer winding. Embodiments of the present passive bearing system function with minimal losses by using a measurement of the voltage appearing across these terminals to determine the proper axial positions of all the bearing elements, i.e., the upper and lower levitation magnet arrays and the stabilizer. Such an arrangement provides switches that operate between two different loading inductances that, if the passive bearing system are placed in an evacuated system, the switches would preferably be located outside the system. This arrangement allows operation in a low stiffness "standby" mode since the stiffness of the stabilizer is a function of the total inductance of the winding (i.e., winding plus external loading inductance). The stabilizer losses would be very small, or, by activating the switch to lower the inductance, a high-stiffness mode is provided, where the passive bearing could resist strong acceleration forces, such as those encountered in vehicular applications of an energy-storage flywheel system.

The new passive bearing system also offers the possibility of operating in a "passive/active" mode, one where it can respond dynamically in the same manner as conventional active magnetic bearings. Here however the sensor of deviations from equilibrium, a separate system in conventional active hearings, is "built in," as follows. Upon an axial deviation from equilibrium, a voltage is produced in the winding or windings of the stabilizer. When this occurs, an electronically switched change in the external loading inductance could be made that would produce a proportionate restoring force with no requirement for external power input.

Depending on whether the passive levitating hearing elements are stable against transverse displacements (and unstable against axial displacements) or vice-versa, one could employ either the planar stabilizer described above or a radial version, such as that shown in FIG. 4 of U.S. Pat. No. 5,847, 480 "Passive Magnetic Bearing Element with Minimal Power Losses." However, in the latter case, if the hearing is to be used in situations where large centrifugal forces are encountered, as is the case in electromagnetic batteries (flywheel energy storage modules), then mechanically constraining the magnets of the inner cylindrical Halbach array could represent a difficult problem. It would then be highly advantageous to be able to design a null-based stabilizer using a single cylindrical Halbach array supported on its back side against centrifugal forces, with the stabilizer winding located inside the array. A new form of radial stabilizer, described below, accomplishes this objective.

Figure 3:
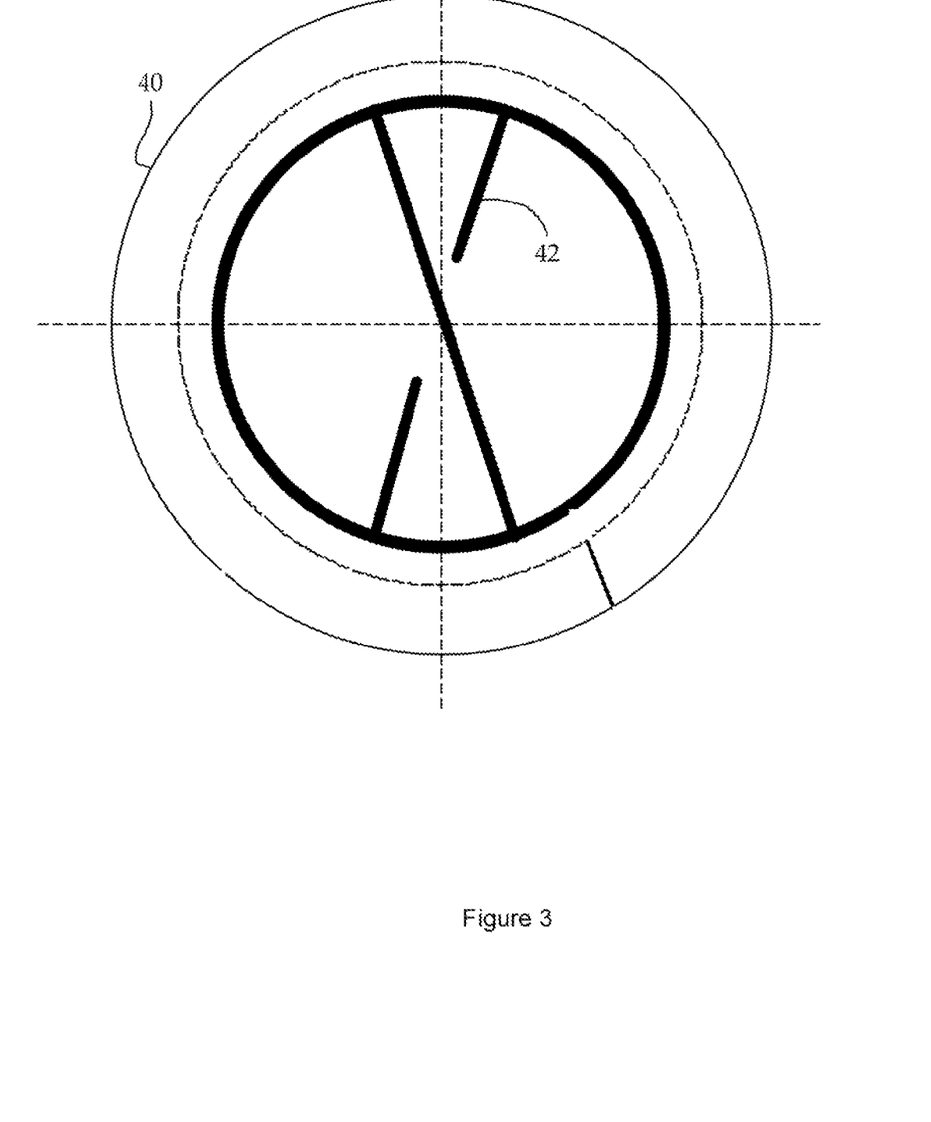
FIG. 3 is a schematic view of flux canceling stabilizer for displacements transverse to the axis of rotation.
Figure 4:
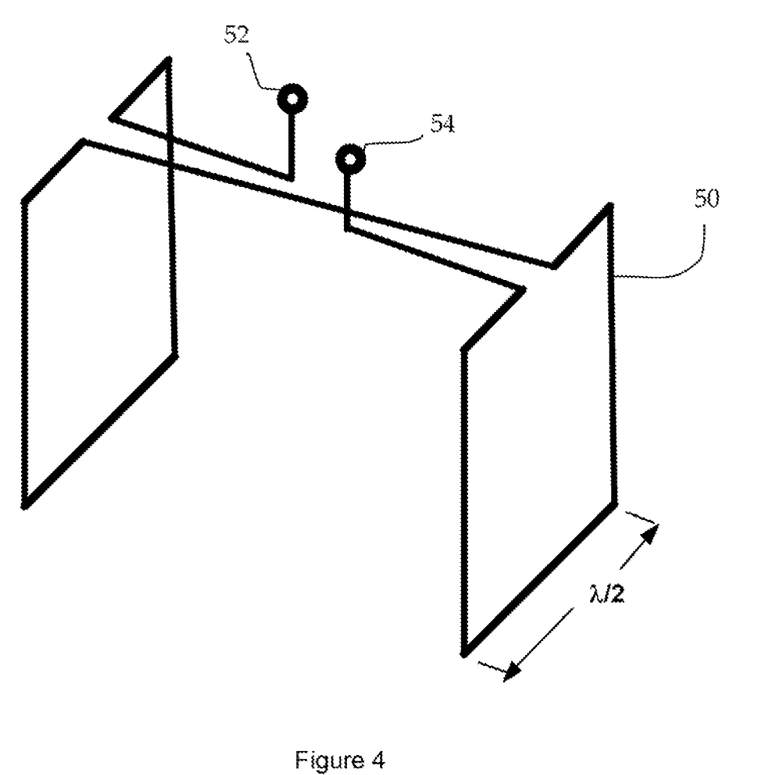
FIG. 4 is a schematic view of typical winding element of the transverse displacement stabilizer showing cross-over connection between opposite sides of the windings.

FIG. 3 shows an axial view of the new stabilizer, which is composed of a cylindrical Halbach array 40 surrounding a special set of windings 42, a cross-section of one circuit element of which is shown in the FIG. 4. If the Halbach array is designed with an even number of spatial half-wavelengths around its circumference then each magnet group will be directly opposite another such group. In such a case the winding circuit element 50 with its cross-over connections as shown in the figure will, when located symmetrically between the two sides of the Halbach array, intercept net-zero flux. A complete winding would then consist of connecting in series a group of such winding elements, each spaced azimuthally from each other by a half-wavelength, with the ends of the complete winding brought out to two terminals, 52 and 54, outside the system. One or more such winding would then be used, depending on the demands of the system. Now, as in the previous case, when the windings are located coaxially with respect to the Halbach array there will be a minimum in the voltage generated in the winding. Here the nulling effect will not be complete (as it was in the previous case), but will be the more pronounced the more care is taken in assuring geometrical accuracy in fabricating the windings and in selecting and mounting the Halbach array magnets.

As was the case with the axial stabilizer, this new radial stabilizer can also be employed in a dual-mode or a passive/active mode of operation. For cases where passive/active operation is required for both axial and radial displacements both types of the new stabilizer assembly could be employed.

The passive bearing system with vertical stabilization that has been described here has three major component parts, an upper (i.e., Halbach array-based) attractive bearing, the vertical stabilizer, and the lower (i.e., Halbach array-based) repelling hearing. When correctly aligned the positive radial stiffness of the upper bearing will be larger than the negative radial stiffness of the lower bearing, so that the system will be stable against radial displacements, but unstable against vertical displacements. The axial stabilizer will render the system stable against both radial and axial displacements, but its positioning axially must be such that its null position corresponds to the position where the sum of the axial forces from the top and bottom hearing elements is just equal to the force of gravity on the levitated mass. This axial location can be determined by the means described above. At this position, the ohmic losses associated with the currents in the stabilizer windings will approach zero as long as the strength of the magnetic levitation fields remains constant. However, the strength of the magnetic fields from the levitation permanent magnets decreases with an increase of temperature and this variation must be taken into account. Since it would be difficult, expensive, and power-consuming to control the temperature of the levitation magnets in order to solve this problem, embodiments of the present invention include another approach. Note that temperature compensation need only be applied to the levitation magnets since the performance of the axial stabilizer is little affected by small changes in the magnetic fields of its Halbach arrays.

Figure 5:
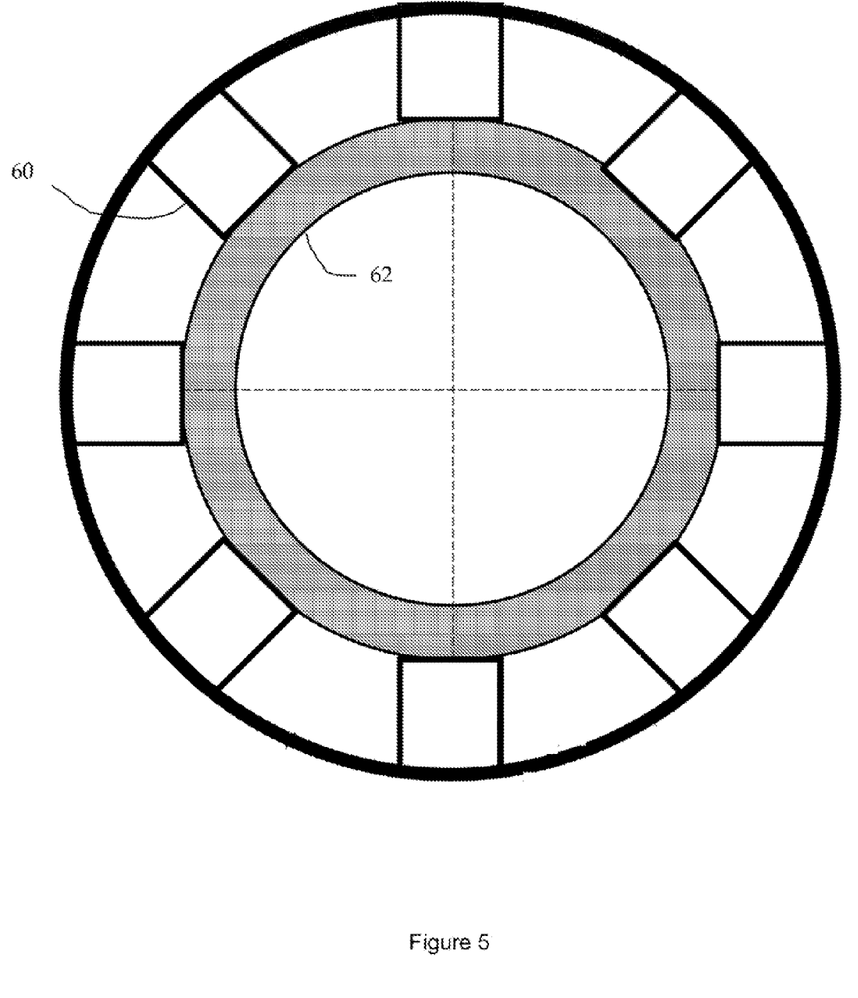
FIG. 5 is a schematic representation of a bi-metallic temperature-compensator mount for levitation Halbach arrays.

The temperature-compensation method proposed here is based on the fact that variation of the magnetic field from a Halbach array in the axial direction is an exponentially decreasing function of the distance from the face of the array. Therefore, to keep the magnetic field constant at a given axial position it is sufficient to provide a means for moving the array axially by an distance (which turns out to be very small) using temperature-sensitive mounts for the arrays. A simple such system is an edge-mounted array of bi-metallic strips. Such a mount is shown schematically in FIG. 5. The bi-metallic strips 60 are fixed to move a bearing magnet 62 toward or away from the corresponding magnet of the rotor. The strips can be used to move the first bearing magnet and/or the second bearing magnet of FIG. 1. Note that in the design of the support a sufficient number of sufficiently stiff bi-metallic strips must be used to insure that the magnets are not appreciably displaced under the levitation load that they are experiencing.

A theoretical/computational analysis has been made from which it is possible to design the bi-metallic support system to compensate for any reasonable temperature variations that the magnet system may be exposed to in normal operation. The results of this analysis are given by Equation 1 which specifies the distance, $\Delta y$ (m,), that the face of each array should be moved (in the direction toward the mid-plane between the two arrays) in order to compensate for a temperature change of $\Delta T°$ C.

$$\Delta y = \frac{1}{k} Log_e [1/(1 + c\Delta T)] \quad (1)$$

where $k=2\pi/\lambda (m^{-1})$, $\lambda (m.)$ is the wavelength of the Halbach array, and c (fractional change in field per C.°) is the temperature coefficient of change in the magnetic field strength of the permanent magnets. For ferrite magnets, for example, c=−0.2% per C.°. The bi-metallic strips can be placed to move the upper bearing toward the upper rotor magnet or can be placed to move the lower bearing toward the rotor lower magnet. In some cases, the bi-metallic strips can be placed in both locations.

Figure 6:
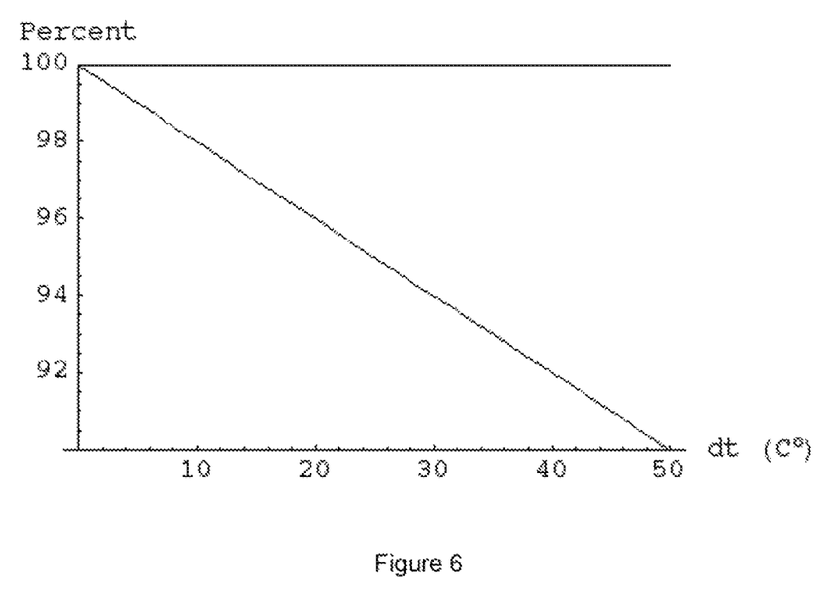
FIG. 6 shows plots of the variation with change in temperature of the magnetic field strength in front of a levitating Halbach array magnet at a fixed location through utilization of a temperature compensating support.
Figure 7:
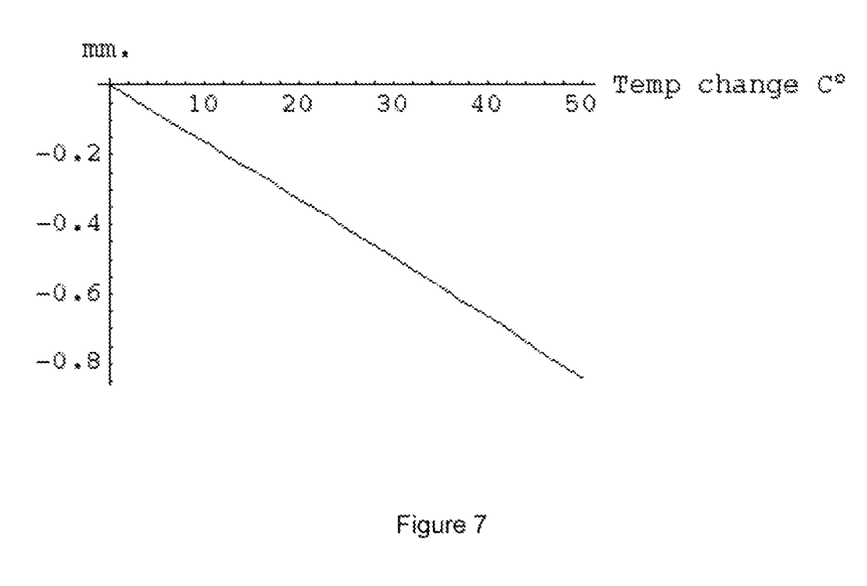
FIG. 7 is a plot of the displacement of a Halbach array in response to temperature change when mounted on a bi-metallic compensator.

Turning to the computed results, FIG. 6 shows a plot of applying Equation 1 to a case of ferrite magnets in a Halbach array with a wavelength $\lambda$=0.05 m. Two curves are shown, the horizontal line is a plot (in percent units) of the prediction of Equation 1, showing that field at a fixed reference position y0=.005 m. is independent of the temperature change, $\Delta T$. The second, downward sloping line, is a plot of the actual percentage variation of the magnetic field at a fixed distance from the face of the array. FIG. 7 is a plot of the actual temperature-dependent displacement of the same Halbach array as a function of $\Delta T$. Note that the displacements required are quite small.

An exemplary assembly according to the present invention includes one or more passive attracting or repelling elements coupled with one or more of the two new types of stabilizers. The new stabilizers are shown to be adaptable to dual-mode (variable stiffness) operation, or operation as self-sensing passive/active bearing systems. Although the descriptions have been confined to vertical-axis systems, the new concepts can also be applied to horizontal-axis systems, such as those described in U.S. Pat. No. 6,657,344, titled "Passive Magnetic Bearing for a Horizontal Shaft," incorporated herein by reference and in U.S. Pat. No. 7,078,838, titled "Passive Magnetic Bearing for a Motor Generator," incorporated herein by reference The new bearing systems offer major advantages for applications of passive bearings that require the minimization of parasitic losses, as in EMB modules used for bulk energy storage of electricity. Their new modes of operation also should open up new areas of application including electric motors and generators, for example.

Embodiments of improved passive bearing stabilizer for transverse displacements include a stabilizer that achieves a null-flux action using a single cylindrical Halbach array rotating around a stationary specially configured stabilizer winding. As described, this winding has a series-connected group of half-wavelength wide windings with crossover connections made in such a way as to cancel the voltage generated by the windings when the axis of the winding coincides with the axis of rotation of the Halbach array. Whenever there is a transverse displacement of the axis of rotation of the Halbach array relative to the axis of symmetry of the windings a voltage will be induced in the winding. The two ends of this winding are connected to an inductance, the value of which is adjusted to limit the displacement-dependent current in the winding to that value required to achieve the positive stiffness required to achieve stabilization of the passive bearing system. A modified winding configuration for the stabilizer acts to suppress whirl instabilities should they attempt to arise in the rotating system, for example in seismic events where the touchdown bearing system comes into play to limit the displacement of the axis of rotation.

The concept is to separate the windings into four quadrant sections. Opposite-side quadrants are connected in opposing series and the two remaining winding ends are connected to an inductance with a value A. The remaining two quadrants, also connected in opposing series, are then connected to an inductance with a value B, not equal to value A. In this way the stiffness of the stabilizer is made to be asymmetric. As has been shown theoretically and demonstrated experimentally in many contexts, asymmetric stiffness is a powerful means for suppressing rotor-dynamic whirl instabilities. This embodiment provides a simple means for introducing asymmetric stiffness in a passive magnetic bearing system.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   a rotor having an axis of rotation;
   a first magnet fixedly attached to said rotor;
   a second magnet fixedly attached to said rotor, wherein said first magnet is spaced apart from said second magnet;
   a first Halbach array attached to said rotor;
   a second Halbach array attached to said rotor, wherein said first Halbach array is spaced apart from said second Halbach array and wherein said first Halbach array and said second Halbach array are both located between said first magnet and said second magnet;
   a first bearing magnet fixedly mounted external to said rotor and configured to attract said first magnet;
   a second bearing magnet fixedly mounted external to said rotor and configured to repel said second magnet; and
   a conductor array fixedly mounted external to said rotor and positioned between said first Halbach array and said second Halbach array, wherein said conductor array comprises windings, wherein a first end of said windings terminates at a first termination and a second end of said windings terminates at a second termination.

2. The apparatus of claim 1, wherein said conductor array comprises a periodicity of one-half of the azimuthal wavelength of said first Halbach array and said second Halbach array.

3. The apparatus of claim 2, wherein said rotor is cylindrical and comprises an inner wall an outer wall, a first end and a second end.

4. The apparatus of claim 3, wherein said first magnet is fixedly attached to said inner wall, wherein said second Halbach array is fixedly attached to said inner wall.

5. The apparatus of claim 3, wherein said first magnet comprises a ring shape and is contiguously attached to said inner wall, wherein said second magnet comprises a ring shape and is contiguously attached to said inner wall, wherein said first Halbach array comprises a ring shape and is contiguously attached to said inner wall, wherein said second Halbach array comprises a ring shape and is contiguously attached to said inner wall of said cylinder and spaced apart from and parallel with said first Halbach array, wherein said first bearing magnet comprises a ring shape and wherein said second bearing magnet comprises a ring shape.

6. The apparatus of claim 1, further comprising a first lead connected to said first termination and a second lead connected to said second termination, 7. The apparatus of claim 6, wherein said first lead is electrically connected to a first side of a load and wherein said second lead is electrically connected to a second side of said load.

8. The apparatus of claim 6, further comprising means for producing a measured voltage by measuring the voltage appearing across said first lead to said second lead, said apparatus further comprising at least one switch that utilizes said measured voltage to switch between two different loading inductances.

9. The apparatus of claim 1, further comprising a bi-metallic support in rigid contact with said second bearing magnet, further comprising means for measuring temperature, wherein said bi-metallic support is activated by a change in said temperature.

10. An apparatus, comprising:
a rotor having an axis of rotation;
a first magnet fixedly attached to said rotor;
a second magnet fixedly attached to said rotor, wherein said first magnet is spaced apart from said second magnet;
a first Halbach array attached to said rotor;
a second Halbach array attached to said rotor, wherein said first Halbach array is spaced apart from said second Halbach array and wherein said first Halbach array and said second Halbach array are both located between said first magnet and said second magnet;
a first bearing magnet fixedly mounted external to said rotor and configured to attract said first magnet;
a second bearing magnet fixedly mounted external to said rotor and configured to repel said second magnet; and
a conductor array fixedly mounted external to said rotor and positioned between said first Halbach array and said second Halbach array, wherein said conductor array comprises windings, wherein the positive (attracting) stillness for radial displacements of said first magnet with respect to said first bearing magnet is greater than the negative (repelling) stiffness of said second magnet with respect to said second bearing magnet.

11. An apparatus, comprising:
a rotor having an axis of rotation;
a first magnet fixedly attached to said rotor;
a second magnet fixedly attached to said rotor, wherein said first magnet is spaced apart from said second magnet;
a first Halbach array attached to said. rotor;
a second Halbach array attached to said rotor wherein said first Halbach array is spaced apart from said second Halbach array and wherein said first Halbach array and said second Halbach array are both located between said first magnet and said second magnet;
a first bearing magnet fixedly mounted external to said rotor and configured to attract said first magnet;
a second bearing magnet fixedly mounted external to said rotor and configured to repel said second magnet; and
a conductor array fixedly mounted external to said rotor and positioned between said first Halbach array and said second Halbach array, wherein said conductor array comprises windings, wherein said windings comprises a plurality of windings, wherein equal gaps are located between all of the radially directed conductors.

12. A method, comprising;
attaching a. first magnet to a rotor having an axis of rotation;
attaching a second magnet to said rotor, wherein said first magnet is spaced apart from said second magnet;
attaching a first Halbach array to said rotor;
attaching a second Halbach array to said rotor, wherein said first Halbach array is spaced apart from said second Halbach array and wherein said first Halbach array and said second Halbach array are both located between said first magnet and said second magnet;
attaching a first bearing magnet to a mount located external to said rotor, wherein said first bearing magnet is configured to attract said first magnet;
attaching a second bearing magnet fixedly to a mount located external to said rotor and configured to repel said second magnet; and
attaching a conductor array to a mount located external to said rotor and positioned between said first Halbach array and said second Halbach array, wherein said conductor array comprises windings, wherein a first end of said windings terminates at a first termination and a second end of said windings terminates at a second termination.

13. The method of claim 12, wherein said conductor array comprises a periodicity of one-half of the azimuthal wavelength of said first Halbach array and said second Halbach array.

14. The method of claim 13, wherein said rotor is cylindrical and comprises an inner wall an outer wall, a first end and a second end.

15. The method of claim 14, wherein said first magnet is fixedly attached to said inner wall, wherein said second Halbach array is fixedly attached to said inner wall.

16. The method of claim 14, wherein said first magnet comprises a ring shape and is contiguously attached to said inner wall, wherein said second magnet comprises a ring shape and is contiguously attached to said inner wall, wherein said first Halbach array comprises a ring shape and is contiguously attached to said inner wall, wherein said second Halbach array comprises a ring shape and is contiguously attached to said inner wall of said cylinder and spaced apart from and parallel with said first Halbach array, wherein said first bearing magnet comprises a ring shape and wherein said second bearing magnet comprises a ring shape.

17. The method of claim 12, wherein the positive (attracting) stiffness for radial displacements of said first magnet with respect to said first bearing magnet is greater than the negative (repelling) stiffness of said second magnet with respect to said second bearing magnet.

18. The method of claim 12, wherein said windings comprises a plurality of windings, wherein equal gaps are located between all of the radially directed conductors.

19. The method of claim 12, further comprising a first lead connected to said first termination and a second lead connected to said second termination.

20. The method of claim 19, wherein said first lead is electrically connected to a first side of a load and wherein said second lead is electrically connected to a second side of said load.

21. The method of claim 19, further comprising means for producing a measured voltage by measuring the voltage appearing across said first lead to said second lead, said apparatus further comprising at least one switch that utilizes said measured voltage to switch between two different loading inductances.

22. The method of claim 12, further comprising a bi-metallic support in rigid contact with said second bearing magnet, further comprising means for measuring temperature, wherein said hi-metallic support is activated by a change in said temperature.

23. An apparatus comprising;
a rotor having an axis of rotation;
a first Halbach array connected to said rotor;
a conductor array comprising windings, wherein said conductor array is fixedly mounted external to said rotor, wherein said windings consist essentially of wire, wherein said conductor array comprises a periodicity of one-half of the azimuthal wavelength of said first Halbach array, wherein said windings comprises a plurality of windings, wherein, equal gaps are located between all of the radially directed conductors.

24. The apparatus of claim 23, wherein said windings comprise four separate quadrant sections, wherein opposite-side quadrants are connected in opposing series and the two remaining winding ends of said opposite-side quadrants are connected to an inductance with a first value, wherein the remaining two quadrants are connected in opposing series and are connected to an inductance with a second value not equal to said first value to produce an asymmetric stiffness for suppressing rotor-dynamic whirl instabilities.

25. The apparatus of claim 23, wherein a first end of said windings terminates at a first termination and a second end of said windings terminates at a second termination, further comprising a first lead connected to said first termination and a second lead connected to said second termination, wherein said first lead is electrically connected to a first side of a load and wherein said second lead is electrically connected to a second side of said load, further comprising means for producing a measured voltage by measuring the voltage appearing across said first lead to said second lead, said apparatus further comprising at least one switch that utilizes said measured voltage to switch between two different loading inductances.

26. The apparatus of claim 23, further comprising:
a first magnet fixedly attached to said rotor;
a second magnet fixedly attached to said rotor, wherein said first magnet is spaced apart from said second magnet;
a second Halbach array attached to said rotor, wherein said first Halbach array is spaced apart from said second Halbach array and wherein said first Halbach array and said second Halbach array are both located between said first magnet and said second magnet;
a first bearing magnet fixedly mounted external to said rotor and configured to attract said first magnet;
a second bearing magnet fixedly mounted external to said rotor and configured to repel said second magnet; and
wherein said conductor array is positioned between said first Halbach array and said second Halbach array, wherein said conductor array comprises windings.

27. The apparatus of claim 26, wherein the positive (attracting) stiffness between said first magnet with respect to said first bearing magnet is greater than the negative (repelling) stiffness of said second magnet with respect to said second bearing magnet.

28. The apparatus of claim 26, further comprising a bi-metallic support in rigid contact with said second bearing magnet, further comprising means for measuring temperature, wherein said bi-metallic support is activated by a change in said temperature.

29. The apparatus of claim 23, wherein said first Halbach array comprises a cylindrical shape, wherein said windings comprises a series-connected group of windings having a width of one .half-wavelength of said Halbach array and wherein said windings have crossover connections configured to cancel the voltage generated by the windings when the axis of said windings coincides with the axis of rotation of the Halbach array.

30. The apparatus of claim 29, wherein said windings comprise a first end and a second end, wherein said first end and said second end are electrically connected to opposite ends of an inductance.

31. The apparatus of claim 30, wherein said inductance comprises a value selected to limit the displacement-dependent current in the winding to achieve the positive stiffness required to achieve stabilization of the passive bearing system.

* * * * *